United States Patent [19]

Awerbuch et al.

[11] 4,370,858
[45] Feb. 1, 1983

[54] APPARATUS AND METHOD FOR ENERGY PRODUCTION AND MINERAL RECOVERY FROM GEOTHERMAL AND GEOPRESSURED FLUIDS

[75] Inventors: Leon Awerbuch, San Francisco; Alfred N. Rogers, Pleasanton, both of Calif.

[73] Assignee: Bechtel International Corporation, San Francisco, Calif.

[21] Appl. No.: 288,713

[22] Filed: Jul. 31, 1981

[51] Int. Cl.³ .............................................. F03G 7/00
[52] U.S. Cl. ................................. 60/641.5; 60/641.2; 210/747; 210/714; 210/170
[58] Field of Search ............... 60/641.2, 641.3, 641.5; 210/170, 747, 714, 715; 165/45; 203/7, DIG. 20

[56] References Cited

U.S. PATENT DOCUMENTS 4,127,989  12/1978  Mickelson ..................... 60/641.2
4,304,666  12/1981  Van Note ...................... 60/641.2

*Primary Examiner*—Allen M. Ostrager
*Attorney, Agent, or Firm*—Townsend and Townsend

[57] ABSTRACT

Apparatus and method for using the vapor fraction of geothermal or geopressured fluid to produce useful work and for using the solid fraction of the fluid for producing minerals of commercial value while providing protection from scaling. The fluid is directed into a first chamber in which the fluid flashes to generate the vapor fraction. A circulatory flow through the first chamber occurs as a result of the flashing of the vapor fraction, causing the vapor fraction to separate from the solid and liquid fractions and allowing the vapor fraction to pass to a fluid-actuated, work-producing apparatus. The solid and liquid fractions gravitate into a second chamber adjacent to the first chamber and extending below the first chamber. The second chamber permits at least a portion of the liquid fraction to separate from the solid fraction by clarification. Crystal growth continuously occurs in the first and second chambers as the circulation of the fluid continues through the first chamber. When the crystals become large enough, they gravitate to the bottom of the second chamber and can be removed therefrom. The separated liquid fraction of the fluid can be directed to a point of disposal or through one or more additional reactor stages to recover the remaining energy and mineral values therefrom. Several embodiments of the apparatus as disclosed.

77 Claims, 4 Drawing Figures

APPARATUS AND METHOD FOR ENERGY PRODUCTION AND MINERAL RECOVERY FROM GEOTHERMAL AND GEOPRESSURED FLUIDS

BACKGROUND OF THE INVENTION

In the use of geothermal brines for recovering the energy values thereof for use, for example, in power plants, and in recovery of combustion gas from geopressurized fluids, a number of problems arise. One of these problems is scale formation which occurs when the brine is flashed and/or drops in temperature, leading to the deposition of scale on adjacent surfaces. Scaling sometimes becomes so extreme that plant operation must be shut down after a relatively short operating time for maintenance to remove the scale so that the plant can be placed in operation once again as soon as possible.

Other problems which arise include those related to the presence of suspended solids in spent brine which are to be directed back into the ground, such as into a reinjection well for disposal or other purposes. Because of the presence of solids in the spent brine, scaling and plugging of injection pumps, associated equipment and the subterranean formation occur which requires interruption of operation to remove the scale to permit reinjection operations to continue. This interruption may even require the drilling of a new injection well.

In hydrothermal systems, brine in equilibrium with a downhole environment is subjected to a change in thermodynamic conditions as the brine travels up a wellbore and through fluid lines and into plant components. As a result, dissolved gases are released, the brine pH and chemical balance change, and solids in the brine can precipitate to form scale. The problem is further complicated by the progressive changes in temperature and composition as the brine moves through the plant and back into the ground, depositing scales of varying compositions at various locations in its transmit through the plant and reinjection well. The normal flash process produces spent brine which is supersaturated with respect to solids, such as silica, metal sulfides and metal sulfates or carbonate compounds. The precipitation of these compounds in plant components and in an injection well along with plugging of the subterranean formations makes it imperative that a solution be found for the problem of scale control.

Conventionally, three methods have been tested and used for the control of scaling in geothermal brines, namely scale retardation or inhibition, chemical and mechanical removal of scale, and the use of redundant equipment. However, none of these techniques has been practiced in which energy and mineral values are simultaneously recovered from the brine. The performance of these conventional techniques is time-consuming and relatively expensive, thereby giving rise to the realization of the need for improvements in the handling of geothermal brines so as to avoid the problems of scale formation while obtaining the greatest amount of energy and mineral recovery from the brines.

For protecting injection wells against scale formation, the reactor-clarifier unit is used. Such a unit operates on the principal of solids contact clarification and not on crystal growth. This requires a reactor-clarifier unit separate from the plant equipment which recovers energy values from geothermal fluid, thereby increasing equipment, labor and operating costs. However, the reactor-clarifier does not protect the geothermal power plant from scaling problems as the reactor-clarifier is located downstream of the power plant.

Another aspect of the handling of geothermal brines is the crystallization of the solid fractions of the brines to extract the mineral values therefrom. This is achieved by crystallization techniques which generally have been known for well over 100 years. However, these techniques have not been associated with the simultaneous extraction or recovery of energy values from the geothermal brine while preventing substantial scale formation. Also crystallization has occured in equipment separate from the plant and equipment used for flashing geothermal brines to recover energy values from the brine.

Two steps are involved in the precipitation of crystal matter from a solution, i.e., the crystals must first form and then grow. The formation of a new solid phase in the solution or in the solution by itself is called nucleation. The increase in size of a crystal with a layer-by-layer addition of solute is called growth. Both nucleation and crystal growth have supersaturation as a common driving force. Unless a solution is supersaturated, crystals therein can neither form nor grow. The problem then is to provide equipment in a crystallizer which promotes nucleation and crystal growth. In the past, this has required that clarification equipment be separate from the flash equipment used for recovering energy from the brines. Thus, because of the expense and consumption of time in the operation of conventional reactor-clarifiers, a need has arisen for improvements in the recovery of mineral values in the form of crystals from the solid fractions of brines without the need for separate clarification equipment.

While there are a number of patents in geothermal energy recovery, they all relate to 2-phase processing instead of 3-phase processing of geothermal fluids.

SUMMARY OF THE INVENTION

The present invention relates to improvements in the handling of fluids taken from subterranean locations and capable of being separated into solid, liquid and vapor fractions. Practice of the invention serves to avoid the problems of conventional processing techniques as described above and particularly related to geothermal and geopressured fluids and scale deposition.

To this end, the present invention provides apparatus and method, which includes one or more flash stages, for substantially continuous recovery of the energy values of the fluid while simultaneously allowing for growth of crystals and separating the liquid fraction of the fluid from the solid fraction, all of which is accomplished with substantially no scale formation on adjacent surfaces. The present invention therefore avoids the need for a separate crystallizer and a separate reactor-clarifier unit, since the energy recovery equipment, the clarifier and the crystallizer are all combined and function simultaneously in a single reactor of a single system or in each of a number of reactors of a multiple stage system.

The present invention promotes the rapid growth of crystals because, in the case of the 3-phase fluidization in the present invention, the amount of crystal surface caused by fluidization is more than 1,000 times larger than the area of the adjacent piping and other surface for handling the brine. Thus, the probability of scale formation on the equipment surfaces is relatively small.

Another aspect is that epitaxial growth of crystals can be achieved with the present invention by the proper selection of the seed crystals. However, even if the present system is self-nucleating, crystal growth is relatively rapid without substantial scale formation because fluidization relieves the supersaturation of the fluid to provide rapid precipation of dissolved solids from the fluid. Also, gases or chemicals can be selectively added to the apparatus of the invention to provide for the growth of specific crystals.

Another important aspect of the present invention is that the flashing of the fluid in the apparatus of the present invention causes a circulatory flow so that the movement of the fluid in the reactor causes a 3-phase fluidization and a scrubbing of the equipment surfaces which minimizes any substantial deposition of scale on such surfaces. Because of this flashing action, no pumps, agitators or impellers are required to sustain the circulatory flow due.

Other improvements provided by the present invention include the control of the concentration of the solid fraction of the fluid by adding heat thereto to increase mineral yield, and the use of the flashed vapor fraction for producing pure vapor or steam to be directed to a work-producing apparatus for actuating the same. In the latter case, distillate can, for example be provided by the condensed vapor from the work-producing apparatus and reboiled by the flashed vapor from the apparatus of the present invention to form pure vapor.

The foregoing explanation of the present invention relates generally to geothermal brine and geopressured fluid. The primary resource obtained from geothermal brine are energy and mineral values. The primary resource obtained from geopressured fluids is methane and this is separated from the geopressured liquids and solids by flashing or pressure reduction. Separation of the liquids from the solids is achieved in the same manner as with geothermal liquids and solids to provide the mineral recovery.

Scale formation on the walls of pipes, equipment, and on heat exchange surfaces due to the flow of a liquid with dissolved, scale-forming solids therein can be minimized or prevented entirely by suspending in the liquid a slurry of so-called "seeds" on which scale will precipitate preferentially. For example, in the desalination of sea water, fine particles of calcium sulfate have been suspended in the brine. As a result, calcium sulfate and calcium carbonate precipitate on the seeds, thereby preventing the deposition of scale on the plant surfaces. Alternatively, the seeds may be initially formed in situ from materials precipitated from the water.

Past experience has indicated that the precipitated scalants break off from the seeds during circulation through the plant, frequently in very fine form. The fine particles of scale are difficult to separate from the liquid. For example, after the extraction of thermal energy from a geothermal fluid, it is desirable to reinject the fluid into an injection well. However, the fine scale particles may quickly clog the well. Consequently, it is necessary finally to subject the fluid to filtration.

In the present invention, synthetic seeds of sufficient particle size and density to permit ready separation from the fluid can be provided for controlling scale formation. The seeds in the present invention are made of a fairly heavy metal or mineral. By chemical pretreatment, the surfaces of the particles are etched so as to promote adherence of the scale. Finally, the particles are prescaled with a scale material of crystal structure related to the scale it is ultimately desired to control.

The primary object of the present invention is to provide an improved apparatus and method for handling geothermal or geopressured fluids taken directly from a subterranean well wherein the crystals, liquid and vapor are fluidized while forming the vapor fraction or gas fraction of the brine or fluid for use in the recovery of the energy values thereof while simultaneously crystal growth from the solid fraction of the brine or fluid occurs without scale deposition on equipment walls, and suspended solids are separated from the liquid fraction of the brine or fluid. Thus the energy and mineral values of the brine or fluid can be extracted in a single reactor yet the liquid fraction of the brine or fluid can be reinjected into the ground or other location without plugging pumps and other injection equipment.

Other objects of this invention will become apparent as the following specification progresses, reference being had to the accompanying drawings for an illustration of the invention.

IN THE DRAWINGS

Figure 1:
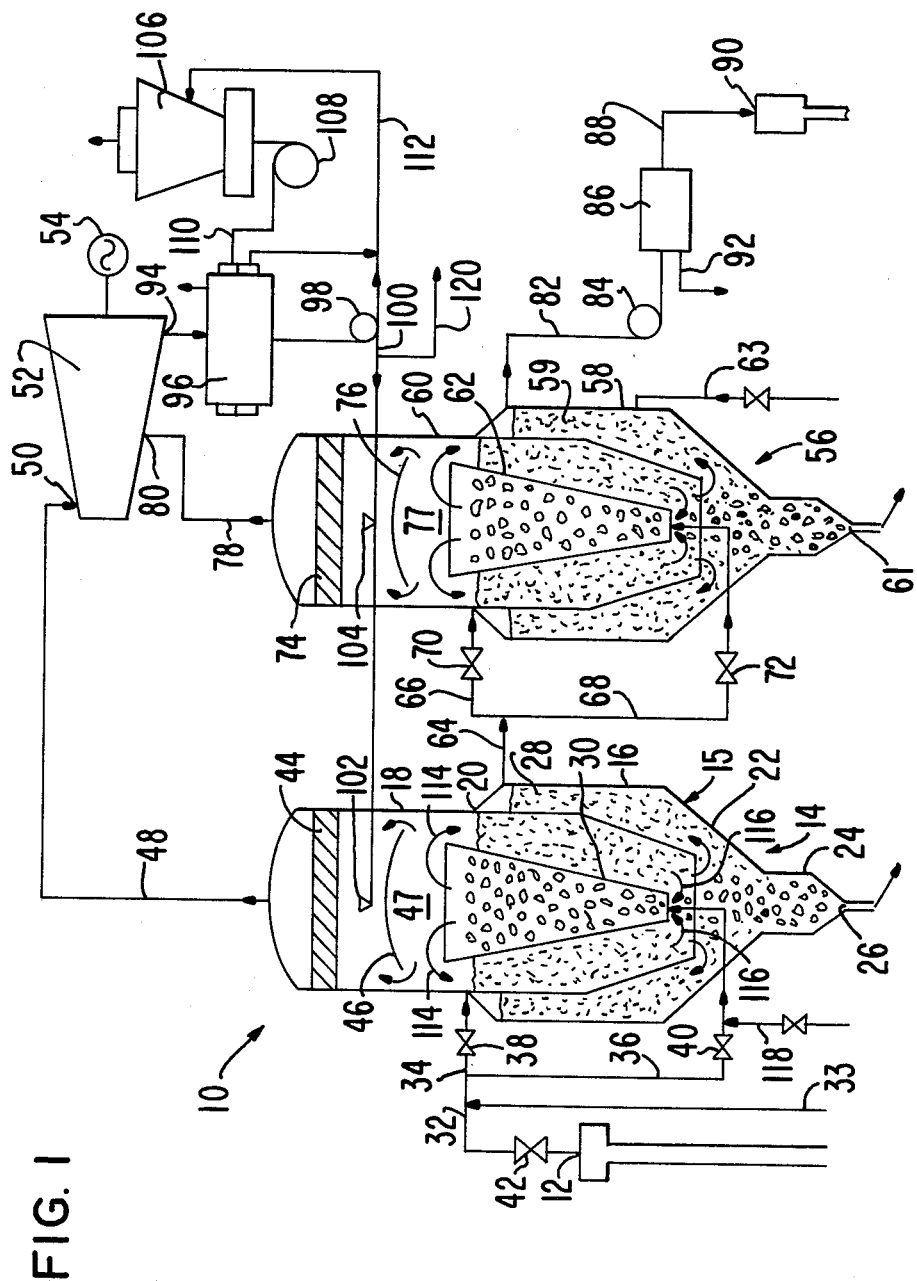
FIG. 1 is a schematic view of a combined flash-crystallizer-separator system for geothermal power production and mineral recovery forming the subject of the present invention.
Figure 1A:
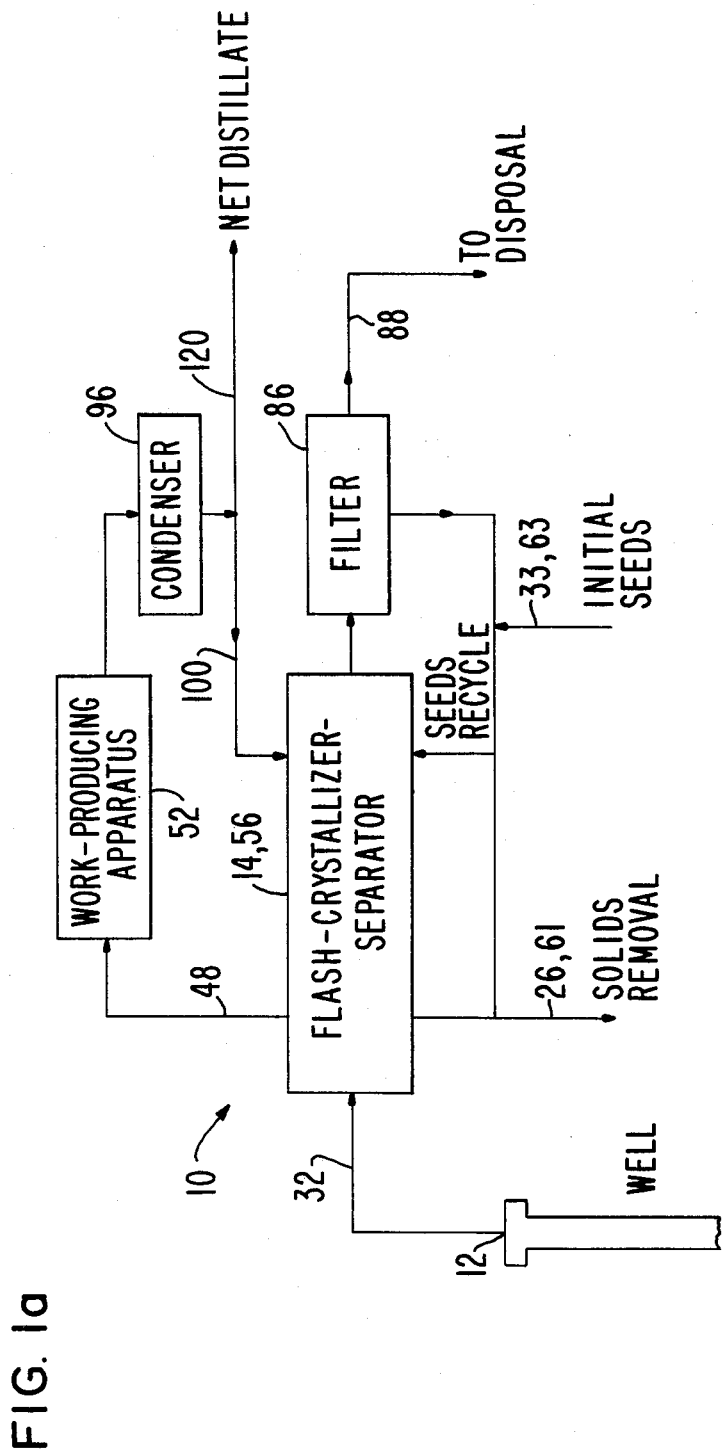
FIG. 1a is a generalized block diagram of the system of FIG. 1.

A preferred apparatus or system of the present invention is broadly denoted by the numeral 10 and is shown in its basic form in FIG. 1. While specific details of system 10 will be hereinafter described, it is to be understood that variations in details of the apparatus and method of the present invention are possible without departing from the teachings of the invention. For instances, the shape of the apparatus of the present invention could be similar to the forced circulation or Oslo type crystallizer. For purposes of illustration, system 10 will be described with reference to the processing of geothermal fluid but it is to be understood that geopressured fluid can be processed in the same manner by system 10.

System 10 comprises one or more flash-crystallizer-separator stages through which geothermal fluid is directed for extracting energy and mineral values from the brine. For purposes of illustration, system 10 is a two-stage system coupled to the outlet 12 of a geothermal well from which geothermal fluid having solid, liquid and vapor fractions can be removed to transform its energy to useful work and to recover its solids as valuable minerals.

The first stage of system 10 comprises a reactor 14 having a housing 15 defining a lower, hollow body 16 and an upper, hollow body 18. Body 18 is received in a central opening 20 in the upper end of body 16. Body 18 is generally cylindrical and is closed at the upper end thereof and is open at the lower conical end thereof so as to communicate with body 16 centrally thereof. Body 16 has a lower conical portion 22 which extends downwardly and communicates with a cylindrical portion 24 of reduced cross section and having an outlet opening 26 from which solids can be selectively removed from body 16 for recovery of the mineral values of the brine. The upper, annular space 28 of body 16 surrounding the lower end of body 18 provides a region which is closed to the atmosphere and which can receive substantially clarified liquid brine after the brine has passed downwardly through body 18 and then upwardly into space 28. In this way, separation of liquid brine from solids in the brine can occur, the solids continuing downwardly in body 16.

An interior, hollow body 30 is mounted in any suitable manner in reactor 14 at a location with body 30 being partially within body 18 and partially within body 16. Body 30 is open at both ends and, for purposes of illustration, is conical in shape with its smallest part at its lower end.

A fluid line 32 is coupled to the outlet 12 of the geothermal well, and line 32 splits into two fluid lines 34 and 36 having respective valves 38 and 40 for control of brine flow therethrough. A valve 42 controls the flow of brine through line 32.

Line 34 communicates with the interior of body 18 at a location below but close to the upper end of body 30 as shown in FIG. 1. Line 36 extends laterally and into the lower end of body 16 and has an inner end terminating at and in fluid communication with the lower, open end of body 30. By virtue of fluid lines 34 and 36, brine having dissolved and suspended solids therein can be directed into reactor 14 at two locations. The volume rates of flow of brine into the reactor at the two locations are controlled by valves 38 and 40 to achieve certain aims, including the control of the vapor or steam fraction which is generated by flashing and cooling when the brine enters body 30 at its lower end and is allowed to expand therein to provide 3-phase fluidization of solids, liquid and vapor.

Body 30 has means at its lower end to permit flashing of the brine as the brine enters body 30. Such means can include a valve, a nozzle, means defining an orifice, or a turbine.

A mist eliminator 44 is in the upper end of body 18 above a curved deflector plate 46, the latter being in the open space 47 above the open top of body 30. Thus, the vapor or steam leaving body 30 and the vapor or steam entering body 18 from line 34 will rise and be deflected around plate 46 and then through demister 44, for flow out of body 18 through a fluid line 48. Line 48 is coupled to the fluid inlet of a fluid-actuated work-producing apparatus, such as the high pressure inlet 50 of a turbine 52 coupled to an electrical generator 54. In this way, the energy values of the brine from a geothermal well can be extracted and used to perform useful work.

The second stage of system 10 is substantially the same in construction as its first stage in that the second stage has a reactor 56 provided with a lower, hollow body 58, an upper, hollow body 60, and an interior, open end body 62 extending partially into bodies 58 and 60 and supported in any suitable manner in reactor 56. Bodies 58, 60 and 62 of reactor 56 have substantially the same shapes as bodies 16, 18 and 30 of reactor 14, and the flow of brine from reactor 14 to reactor 56 is by way of a fluid line 64 communicating with region 28 of body 16, line 64 branching into two fluid lines 66 and 68 provided with respective valves 70 and 72. Line 66 directs brine into body 60 at a location below but near the upper end of body 62. Line 68 extends into body 58 and has an inner end communicating with the lower open end of body 62.

A mist eliminator 74 is in body 60 near the upper end thereof above a curved deflector plate 76, the latter being in the space 77 above the open top of body 62. A fluid line 78 allows vapor or steam from the upper end of body 60 to pass to the fluid inlet of a fluid-actuated, work-producing apparatus, such as the low pressure inlet 80 of turbine 52.

Reactor 56 has an annular, closed space 59 at the upper end of body 58 and surrounding the lower end of body 60. Space 59 receives substantially clarified liquid brine after the latter has been separated from solids by clarification. A fluid line 82 is coupled to and extends outwardly from space 59 and is connected with a pump 84 and, a filter 86. A fluid line 88 couples the outlet of filter 86 to the inlet 90 of a reinjection well or other collection station for receiving spent brine. Filter 86 has means 92 for removing the filter cake therefrom. The filter cake can be disposed of or can be directed back into either or both reactors for use as nuclei for crystallization. For instance, the cake can be directed into reactor 56 through a line 63 or into reactor 14 by line 33.

The fluid outlet 94 of the work-producing apparatus, such as turbine 52, is coupled to the inlet of a condenser 96 whose outlet is coupled by a pump 98 to a fluid line 100. A part of the condensate from condenser 96 is directed through line 100 to nozzles 102 and 104 beneath or above mist eliminators 44 and 74, respectively. Nozzles 102 and 104 direct condensate onto the mist eliminators to clean them. The rest of the condensate is sent by pump 98 to distilled water storage by line 120 or to the cooling tower by line 112. A cooling tower 106 having a pump 108 directs cooling fluid through condenser 96 by way of lines 110 and 112.

In operation, geothermal fluid, that is, brine and/or steam or superheated steam, is removed from the geothermal well and flows out of outlet 12, through line 32 and, depending upon the settings of valves 38 and 40, into bodies 18 and 30. Suspended solids can be added in line 32 through a line 33 (FIG. 1) to serve as nuclei for crystallization. Typically, a major portion of the brine flows through line 36 and into the lower end of body 30. When the fluid enters body 30, the brine, because of its high pressure and temperature, flashes partially into vapor. The flashing action causes the solid, liquid and flashed vapor fractions of the brine to rise and to be in intimate contact with each other, i.e., in a 3-phase fluidization relationship, in body 30. The prompt contact with circulating, suspended solids at the instant of flashing further causes the supersaturation of the brine to be relieved promptly, an important consideration in achieving the growth of large crystals. The vapor fraction continues upwardly after it flows out of body 30, and the solid and liquid fractions overflow the upper end of body 30 and then gravitate therefrom. Thus, the flashed vapor fraction of the brine is separated from the solid and liquid fractions of the brine at the upper end of body 30, and this separation action continues so long as brine is supplied through line 36 to the lower end of body 30.

A circulation flow of brine is created by the flashing action in body 30. This circulatory flow causes brine to overflow the open top of body 30 and to gravitate through the lower end of body 18 and into body 16. This circulation is denoted by arrows 114 at the upper end of body 30. Brine flows from body 16 into the lower end of body 30 by the atomizing or aspirating action caused by brine flow into body 30 from line 36. This flow is denoted by arrows 116 at the lower end of body 30. Thus, there is a continuous upward movement of brine in body 30 and a downward movement in bodies 18 and 16 so long as brine is supplied from line 36 to body 30.

The vapor created by flashing in body 30 rises and passes around deflector plate 46, through demister 44, into fluid line 48 and into the fluid inlet 50 of turbine 52 for driving the same. Thus, energy production is achieved with the high pressure vapor fraction of the brine.

The conical configuration of body 30 defines an expansion chamber which allows the expansion of the brine and thereby an efficient flashing of the brine to generate the vapor fraction of the brine. Body 30 can be of any other configuration, such as a cylindrical configuration, if desired; however, the release of the vapor fraction from the solid and liquid fractions is then not as pronounced as in the case of a conical configuration.

As the solid and liquid fractions of the brine gravitate from the upper end of body 30, a part of the liquid fraction of the brine separates from the major part of the brine containing suspended solids. To provide for this separation, the lower end of body 18 defines a baffle which allows liquid brine, although having some suspended solids therein, to rise into region 28 for clarification and flow out of body 16 through line 64 to the second stage of system 10. The remainder of the brine, including the solid fraction thereof, continues to gravitate into body 16.

Growth of crystals occurs in bodies 16, 18 and 30 during the circulation of brine through these bodies. The crystal growth occurs on the solid particles of the brine if the system 10 is self-nucleating. In this case, the size of the brine particles progressively increase due to the continuous addition of brine to reactor 14. Alternatively, body 30 can initially be provided with a bed of seed particles having the same or similar chemical composition of the minerals or crystals which are to be obtained from system 10. Such seed particles, for instance, could be sand, glass or metal. In either case, body 30 functions as a fluidized bed in which 3-phase fluidization occurs, causing intimate contact between liquid, vapor bubbles and suspended solids. The seed particles, during fluidization, progressively grow in size in reactor 14 as the brine is continuously supplied to it.

The larger particles or crystals grown in the reactor eventually gravitate into the lower end of body 16 and into hollow portion 24 for removal through outlet 26. The rate of crystal growth and the ultimate size of the crystals when removed from reactor 14 are controlled by varying the brine slurry concentration in the reactor by varying the relative rate of removal of solids and liquid brine from the reactor. For control of slurry concentration and for plant start-up, a portion of the solids discharged from reactor 14 can be recirculated to the reactor, such as by way of line 33 (FIG. 1). This can be accomplished also with reactor 56 as well. Thus, system 10 provides mineral growth and recovery when the crystals or brine solids are sufficiently large for commercial purposes.

Classification of the mineral product is achieved in lower portion 24 which serves as an elutriation leg in which a small portion of the saturated brine liquid fluidizes the crystals and returns small, fine crystals to the main portion of body 16. A portion of the crystals removed from body 16, after treatment, can be returned to reactor 14 for use as nuclei for crystallization. Line 33 can be used for this purpose.

The brine leaving body 16 through line 64 is a pressurized and heated liquid solution with dissolved minerals and a small amount of suspended solids. It is also able to provide additional mineral recovery and power generation since the pressure and temperature of the brine leaving body 16 through line 64 is relatively high, the temperature being of the order of 370° F. This is to be compared with the typical temperature of 500° F. of the brine at the bottom of the geothermal well and flowing into line 32 toward reactor 14.

An injection of a suitable gas or other chemical can be supplied by way of a line 118 in FIG. 1 coupled to line 36 of the first stage. The addition of such a gas or chemical permits a chemical reaction to occur, resulting in the precipitation of certain types of solids, such as silver sulfide (assuming $H_2S$ is the injected gas) for recovery through outlet 26 of body 16. Any gaseous phases introduced in the first stage through line 118 and not precipitated pass out of the first stage with the flashed vapor flowing through line 48 to the work-producing apparatus. Similarly, a binary fluid such as isobutane can be supplied by way of line 118 to reactor 14. The addition of such a binary fluid permits extraction of the heat from geothermal brine by boiling the binary fluid to generate binary fluid vapor. The binary fluid vapor causes 3-phase fluidization of crystals in reactor 14. The binary fluid vapor flows through line 48 and, after condensing and being preheated, is recycled to reactor 14 by way of line 118. When a binary fluid contacts the geothermal brine in the reactor, the condensed vapor must be freed from traces of the binary material prior to use of the condensate for certain purposes, e.g., for human consumption.

The amount of brine introduced to reactor 14 through fluid lines 34 and 36 is controlled through valves 38 and 40, respectively. This control is desired, for instance, to provide a specific ratio of the volume rate of flow of brine introduced through line 34 to the vapor fraction flashed in body 30. Thus, for instance, by reducing the brine introduced into the lower end of body 30, a reduced amount of the flashed vapor will be generated which, in turn, will reduce the velocity of the circulatory flow in reactor 14. Thus, valves 38 and 40 can be selectively actuated to achieve specific results.

Brine flowing out of first stage enters the second stage through lines 66 and 68, both of which are controlled by valves 70 and 72 for the reasons set forth above with respect to brine flow into the first stage. The brine entering the lower end of body 62 flashes to create a circulatory flow of brine in reactor 56. The flashed vapor fraction flows upwardly into space 77 above body 62 and then out of body 60, through line 78 to the fluid inlet of a fluid-actuated work-producing apparatus, such as to the low pressure fluid inlet 80 of turbine 52. The liquid and solid fractions of the brine gravitate through body 60 and into body 58 where the liquid fraction rises by clarification into region 59 surrounding the lower end of body 60. Thus, reactor 56 permits separation of solid and liquid fractions without the need for a separate clarifier as has been required in prior reactors.

Crystal growth occurs in reactor 56 primarily in body 62, and the space between bodies and 62 but also in body 58 in the lower portion thereof. Mineral product or sludge removal occurs through outlet 61 of body 58. Flocculant or chemical injections can be supplied to the interior of body 58 through line 63, if desired. The crystal or mineral growth and recovery can be self-nucleating in reactor 56, or body 62 can initially be charged with a bed of seed particles having the same or similar chemical composition as the minerals to be recovered. The chemical compositions of the minerals or sludge removed from reactor 56 through line 61 are different from those removed from reactor 14 because the reactors operate at different temperatures and various crystals precipitate and grow at characteristic temperatures. Such separation of solids is of commercial importance for two reasons, namely, because of the enhanced commercial value of having a number of sludge fractions, each enriched in specific minerals, and because of the savings realized in reducing the amount of worthless fraction which must be disposed of to land fill.

The seed particles can be sand, glass or metal pebbles which provide surface portions for scale deposition. The pebbles can be prepared by etching so that they have more active sites for mineral scale deposition. Then the pebbles can be removed like other crystals and the scale can be cracked and removed from them or acid leached and the pebbles can then be recycled.

The liquid brine leaving the second stage passes through line 82 through filter 86 and into the reinjection well or other disposal location after the solids from the brine have been substantially removed therefrom. Thus, there will be substantially no plugging of the reinjection well due to the presence of solids in the brine directed into the well since the brine has been stabilized by precipitation in the reactors so that post-precipitation will not occur in the injection lines or well.

Figure 2:
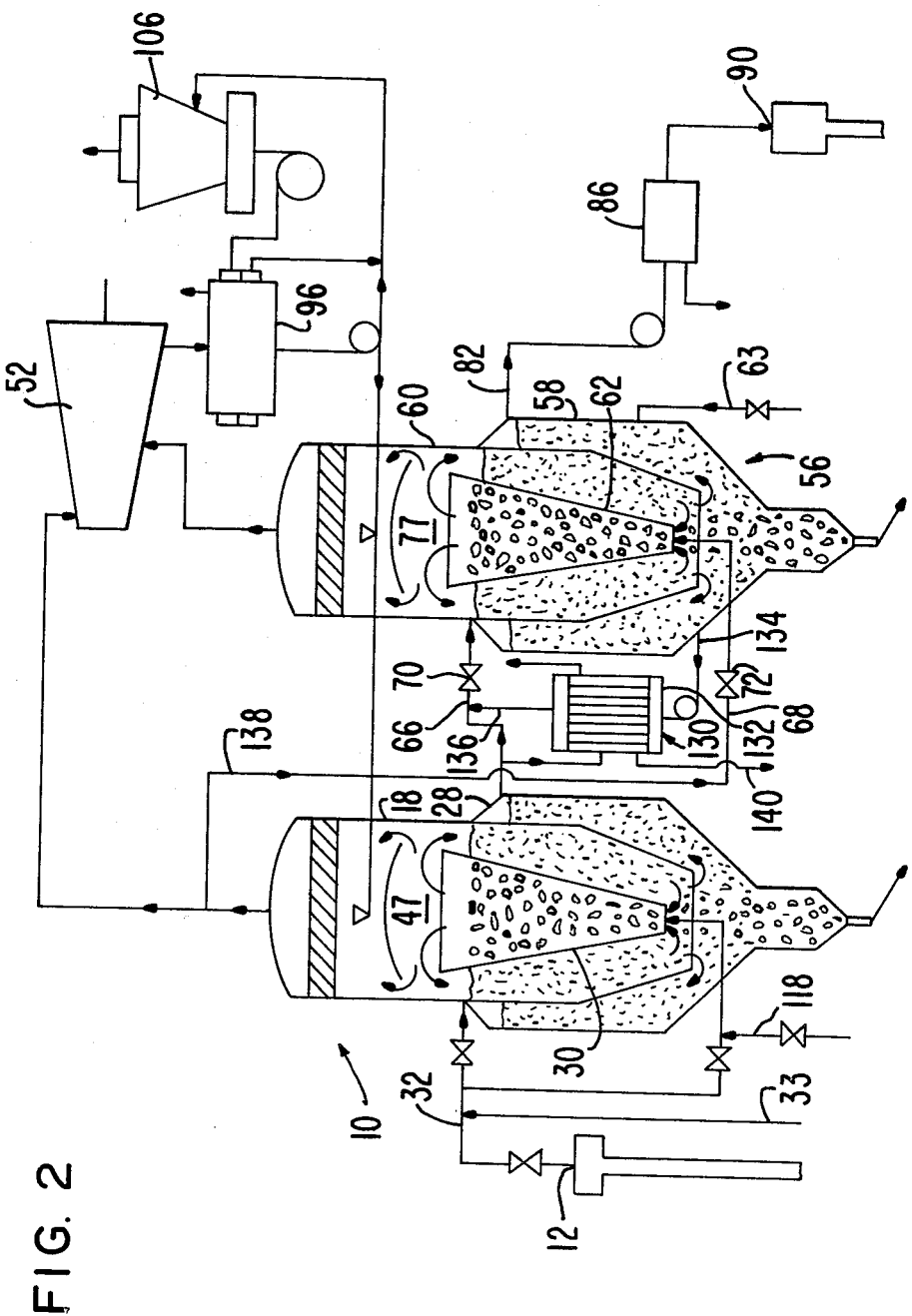
FIG. 2 is a view similar to FIG. 1 but showing a first, slightly modified version of the system of FIG. 1.

System 10 can be slightly modified in the manner shown in FIG. 2 wherein a portion of the flashed vapor or steam fraction of the brine in the first stage is used to provide the heat of vaporization for a portion of the brine in the second stage. To this end, a heat exchanger 130, such as a vertical tube evaporator, has a fluid inlet 132 coupled by a fluid line 134 with the interior of body 58 to receive a portion of brine therefrom. The brine flows upwardly and out of heat exchanger 130 through a fluid line 136 to fluid line 66 for flow into body 60. A portion of the steam flowing upwardly through line 48 of the first stage is tapped off and directed by way of a fluid line 138 to the vapor inlet of heat exchanger 130. The condensate outlet of heat exchanger 130 is coupled with a fluid line 140 which directs condensate to a remote location as desalinated water or other use.

The purpose of the modification of system 10 as shown in FIG. 2 is to increase the concentration of the brine in body 58 of the second stage so as to provide a higher production of minerals in this stage. This is achieved by heating the portion of the brine removed from body 58 by way of heat exchanger 130 so that a greater volume of the brine is converted into vapor, thereby decreasing the liquid fraction and concentrating the solid fraction. The vapor formed in this manner rises and flows out of the second stage to the work-producing apparatus, such as turbine 52.

Figure 3:
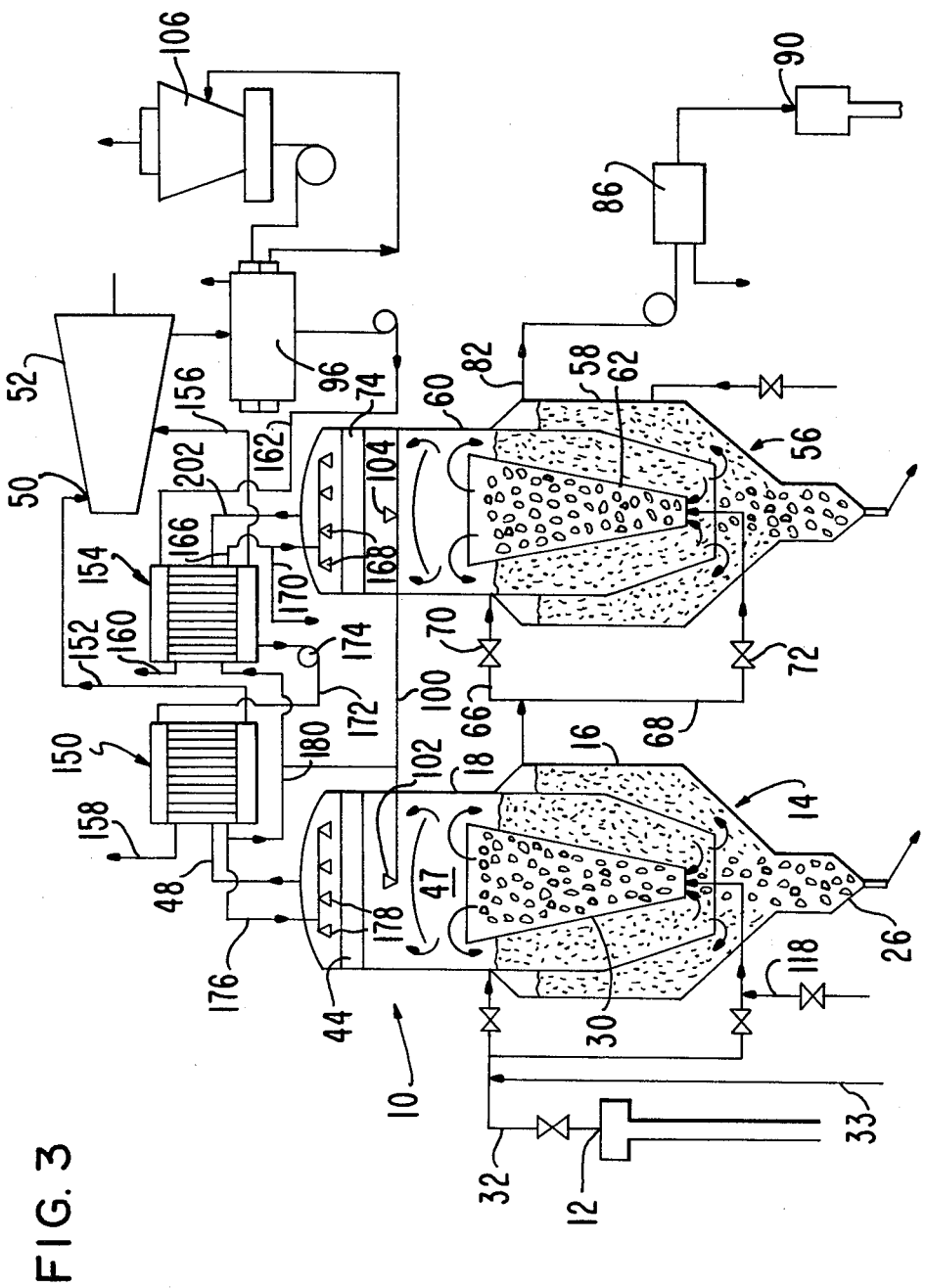
FIG. 3 is a view similar to FIG. 1 but showing a second, slightly modified version of the system of FIG. 1.

A further modification of system 10 is shown in FIG. 3 in which the vapors from the first and second stages are directed through a reboiler cycle for producing pure vapor or steam for flow to turbine 52 or other work producing apparatus.

To this end, condenser 96 supplies its condensate, which may be either water or binary working fluid, by way of line 162 to the reboiler inlet of a heat exchanger 154. In heat exchanger 154, the condensate is heated and partially boiled by the condensation of vapor delivered from reactor 56 via line 202. The vapor generated by the boiling action in exchanger 154 flows along line 156 to the low pressure inlet of turbine 52. That fraction of the condensate which has not been boiled is directed by way of fluid line 172 and pump 174 to the reboiler inlet of heat exchanger 150. The reboiled distillate, converted into substantially pure vapor in heat exchanger 150, is directed by fluid line 152 to the high pressure inlet of turbine 52. The heat for this vaporization is provided by vapor from reactor 14, which flows by line 48 to the heat exchanger 150.

Condensed brine vapor from heat exchanger 150 flows out of the same through line 176 to a number of spray heads 178 above mist eliminator 44 for cleaning said mist eliminator. It also flows out of heat exchanger 150 through a second line 180 to heat exchanger 154 to provide the additional heat of vaporization for the reboiler 154, where it gives up a portion of its heat content prior to discharge via line 166. A portion of the discharged water from exchanger 154 is discharged through a number of spray heads 168 above mist eliminator 74 for cleaning said mist eliminator. The portion of the condensed geothermal steam not used for the spraying of the mist eliminator 74 is discharged through line 170 for use as desalinated water. Lines 158 and 160 allow venting of non-condensible gases from heat exchangers 150 and 154.

This method provides substantially complete protection of turbine 52 from geothermal steam, corrosive gases, and removal of environmentally unacceptable gases like hydrogen sulfide upstream of the turbine. To reduce the size of the turbine, the work-producing fluid could be an organic fluid, such as isobutane or isopentane or an inorganic fluid such as ammonia or various mixed working fluids.

As an example of pretreating seeds for scale deposition, fine beads of alumina are etched by immersion in warm, 10% caustic solution, then rinsed. The pretreated beads are heated to a temperature between 200° and 400° F. and dropped quickly into a tank of sea water or geothermal brine causing a thin film of silica plus heavy metal compounds and/or calcium carbonate to deposit on each particle. These coated particles are then circulated in geothermal flash-crystallizer system 10 where the heat of processing causes the scale formers to deposit on the prepared "seeds". The seeds are readily separated from the spent brine before the latter is rejected from the plant.

A preferred seed material is formed by sintering a fine metal dust, such as copper in a controlled atmosphere, so as to form tiny, more or less spherical particles. The sintering conditions are controlled so as to yield porous particles, to which the base coat of scale is readily anchored.

When the circulating seeds reach a maximum size, they are separated from the circulating brine, for example by gravity settling or by elutriation. The deposited scale is easily removed from the seeds either by chemical solution or mechanically, such as by tumbling in water or thermal shock so as to cause the scale to crack off the seed surfaces. Then the rejuvenated seeds are reused in the plant.

What is claimed is:

1. A system for processing fluid from a subterranean location with the fluid having an elevated temperature and pressure, having dissolved and suspended solids therein, and capable of being separated into solid, liquid and vapor fractions comprising: a reactor for receiving a flow of the fluid from a subterranean location; means in the reactor for permitting the fluid received thereby to flash to form the vapor fraction and to provide intimate contact of the solid, liquid and vapor fractions of the fluid in a 3-phase fluidization relationship; means coupled with the reactor for directing the vapor fraction out of the reactor; means in the reactor for causing at least a portion of the liquid fraction of the fluid to separate from the solid fraction thereof; means coupled with the reactor for allowing removal of the solid fraction from the reactor; and means coupled with the reactor for directing the separated liquid fraction out of the reactor.

2. A system as set forth in claim 1, wherein the fluid is geothermal fluid.

3. A system as set forth in claim 1, wherein the fluid is geopressured fluid.

4. A system as set forth in claim 1, wherein said permitting means includes a tubular body having a fluid inlet and a fluid outlet above the inlet, the flashing of the fluid in the body being sufficient to create a flow of liquid and solids through the body.

5. A system as set forth in claim 4, wherein said body has means in the lower end thereof for permitting the fluid to flash in the body, said means being selected from the group including a valve, a nozzle, means defining an orifice, and a turbine.

6. A system as set forth in claim 4, wherein the body is conical and has a minimum cross-section near said fluid inlet thereof.

7. A system as set forth in claim 4, wherein the causing means has a chamber exteriorly of and in fluid communication with the body, said chamber having a space for receiving said portion of the liquid fraction of the fluid by clarification.

8. A system as set forth in claim 7, wherein the chamber comprises an upper space substantially surrounding the outlet of the body for receiving the vapor fraction therefrom, and a lower space surrounding the inlet of the body and extending therebelow for collecting solids separated from the liquid fraction, said space for receiving said portion of the liquid fraction being intermediate the upper and lower spaces, said flow of fluid being a circulatory flow through the body and the chamber.

9. A system as set forth in claim 8, wherein said means for directing the vapor fraction to said work-producing apparatus is in fluid communication with said upper space, the means for allowing removal of the solid fraction from the reactor being coupled to said lower space.

10. A system as set forth in claim 8, wherein the body has an upper, open end communicating with said upper space, there being a deflector plate in said upper space in alignment with and spaced from the upper end of the body.

11. A system as set forth in claim 7, wherein said reactor comprises a hollow housing and a baffle in the housing in surrounding spaced relationship to said body, said space being between the baffle and an inner surface portion of the housing.

12. A system as set forth in claim 11, wherein the reactor has a fluid outlet in fluid communication with said space to permit the liquid fraction of the brine in the space to be removed from the reactor.

13. A system as set forth in claim 4, wherein said reactor has means including a first fluid line for coupling a subterranean location with the fluid inlet of the body, and a second fluid line for coupling a subterranean location to the reactor at a location below the fluid outlet and above the fluid inlet of the body, and valve means for each of the first and second fluid lines, respectively, for controlling the flow of fluid therethrough.

14. A system as set forth in claim 1, wherein is included a second reactor for receiving the liquid fraction of the fluid from the first-mentioned reactor, means in the second reactor for permitting the fluid therein to flash to form the vapor fraction of the fluid and to provide intimate contact of the solid, liquid and vapor fractions of the fluid in a 3-phase fluidization relationship, means in the second reactor for directing the vapor fraction to a work-producing apparatus, means in the second reactor for separating at least a part of the liquid fraction of the fluid from the solid fraction thereof, means coupled with the second reactor for directing the separated liquid fraction to a disposal location, and means coupled with the second reactor for removing the solid fraction of the fluid therefrom.

15. A system as set forth in claim 14, wherein said permitting means in the second reactor comprises a tubular body having a fluid inlet and a fluid outlet, said separating means including means defining a chamber exteriorly of and in fluid communication with said body, said chamber having a space for receiving said part of the liquid fraction by clarification.

16. A system as set forth in claim 14, wherein is included means coupled with said second reactor for removing a part of the fluid therefrom, means coupled with said removing means for causing a portion of the flashed vapor from the first reactor to flow in heat exchange relationship to the part of the fluid removed from the second reactor, means coupled with said causing means for returning said fluid part to the second reactor.

17. A system as set forth in claim 16, wherein is included means coupled with the second reactor for adding solids thereto.

18. A system as set forth in claim 1, wherein is included means responsive to the heat energy of the vapor fraction of the reactor for boiling a distillate to provide a flow of pure vapor to a work-producing apparatus.

19. A system as set forth in claim 18, wherein said boiling means has means for removing the unboiled fraction of the fluid as a water by-product.

20. A system as set forth in claim 18, wherein said reboiling means has means for removing non-condensible, corrosive and environmentally harmful gases from the vapor fraction of the fluid.

21. A system as set forth in claim 1, wherein is included means coupled with the reactor for adding a chemical thereto for chemical reaction with the solid fraction of the brine therein.

22. Apparatus as set forth in claim 1, wherein is included means coupled with the reactor for adding solids thereto.

23. A system as set forth in claim 1, wherein said permitting means includes a fluidized bed of seeds.

24. A system as set forth in claim 23, wherein the seeds in the fluidized bed have substantially the same chemical composition as that of the minerals of said fluid.

25. A system as set forth in claim 23, wherein the seeds are selected from the group including sand, metal, ceramic and glass pebbles.

26. A system as set forth in claim 23, wherein the seeds are pre-treated by etching.

27. A system as set forth in claim 23, wherein the seeds are pre-treated by being coated with a chemical composition.

28. A system as set forth in claim 23, wherein the seeds are formed by sintering.

29. A system as set forth in claim 28, wherein the seeds are porous.

30. Apparatus for processing a fluid from a subterranean location with the fluid being at an elevated temperature and pressure, having dissolved and suspended solids therein, and capable of being separated into solid, liquid and vapor fractions comprising: a multi-stage system adapted for receiving a flow of said fluid and being operable for separating the solid, liquid and vapor fractions from each other, said system including a number of reactors coupled in series with each other, there being at least one upstream reactor and a downstream reactor, each reactor having a fluid inlet for receiving the fluid and a fluid outlet for directing fluid out of the same, the outlet of an upstream reactor being coupled to the inlet of the downstream reactor, each reactor further having means therein for fluidizing the solid, liquid and vapor fractions of said fluid directed into the inlet thereof, means coupled with said fluidizing means for directing the vapor fraction out of the corresponding reactor, means in each reactor for causing at least a portion of the liquid fraction to separate from the solid fraction of the fluid, means coupled with each reactor for allowing removal of the solid fraction from the reactor, and means coupled with the outlet of the downstream reactor for directing the liquid fraction of the fluid therein out of the same.

31. Apparatus as set forth in claim 30, wherein said fluid is geothermal fluid.

32. Apparatus as set forth in claim 30, wherein said fluid is geopressured fluid.

33. Apparatus as set forth in claim 30, wherein the fluidizing means includes means defining a flash chamber.

34. Apparatus as set forth in claim 33, wherein each reactor includes a hollow housing, said defining means including a tubular body in the housing, the body having an upper open end and a lower open end, the fluid inlet of each reactor being at the lower open end of the corresponding body.

35. Apparatus as set forth in claim 34, wherein the body is substantially conical, the upper end of the body being greater in transverse dimension than the lower end of the body.

36. Apparatus as set forth in claim 30, wherein is included means coupled with at least one of the reactors for adding solids to the fluid therein.

37. Apparatus as set forth in claim 30, wherein said causing means includes means defining a space in surrounding, spaced relationship to said fluidizing means, said space being at a location to receive the liquid fraction by clarification.

38. Apparatus as set forth in claim 37, wherein each reactor has a hollow housing provided with an inner surface, the space defining means including a baffle spaced inwardly from the housing, the space being between the baffle and a portion of said inner surface.

39. Apparatus as set forth in claim 30, wherein said allowing means is near the lowermost extremity of the corresponding reactor.

40. A method of processing a fluid from a subterranean location with the fluid having an elevated temperature and pressure, having dissolved and suspended solids therein and capable of being separated into solid, liquid and vapor fractions comprising: directing the fluid into a first zone; fluidizing the fluid in said first zone to cause the solid, liquid and vapor fractions of the fluid to be in intimate contact with each other; directing the vapor fraction out of the first zone; moving the remainder of said solid and liquid fractions to a second zone adjacent to the first zone; separating at least a portion of the liquid fraction of the fluid in the second zone from the solid fraction; growing crystals in the first and second zones as a function of the movement of the fluid through said zones; removing crystals from said second zone; and directing the separated liquid fraction of the fluid out of the second zone.

41. A method as set forth in claim 40, wherein the fluid is geothermal fluid.

42. A method as set forth in claim 40, wherein the fluid is geopressured fluid.

43. A method as set forth in claim 40, wherein the fluidizing step includes flashing said fluid to form the vapor fraction thereof.

44. A method as set forth in claim 40, wherein said step directing the fluid into said first zone includes moving the fluid through a restriction as the fluid enters the first zone.

45. A method as set forth in claim 40, wherein said step of directing the vapor fraction out of the first zone includes moving the vapor fraction to a work-producing apparatus.

46. A method as set forth in claim 40, wherein said step of directing the vapor fraction out of said first zone includes moving the vapor fraction into heat exchange relationship to a distillate to heat the latter to form substantially pure vapor, and directing the pure vapor to a work-producing apparatus.

47. A method as set forth in claim 46, wherein is included the step of condensing the water from the vapor fraction of the fluid for use as a desalinated water by-product.

48. A method as set forth in claim 46, wherein is included the step of venting the non-condensible gases of the vapor fraction of the fluid to a disposal region.

49. A method as set forth in claim 46, wherein the spent pure vapor from said work-producing apparatus is condensed to form said distillate.

50. A method as set forth in claim 40, wherein said moving step includes maintaining a circulatory flow of fluid through said first and second zones.

51. A method as set forth in claim 50, wherein said maintaining step includes aspirating at least a portion of the fluid from the second zone to the first zone.

52. A method as set forth in claim 50, wherein said maintaining step includes causing the solid and liquid fractions to overflow the first zone and fall by gravity into the second zone.

53. A method as set forth in claim 52, wherein said maintaining step includes aspirating the fluid into the lower end of the first zone from the second zone.

54. A method as set forth in claim 52, wherein said separating step includes allowing the liquid fraction to rise and to enter a confined space as the solid fraction descends in the second zone.

55. A method as set forth in claim 40, wherein said growing step includes increasing the number of nuclei in the solid fraction by self-nucleation.

56. A method as set forth in claim 40, wherein the growing step includes introducing seeds into the fluid to form a fluidized bed of particles.

57. A method as set forth in claim 56, wherein the seeds are added to the fluid before the fluidizing step.

58. A method as set forth in claim 56, wherein the seeds are taken from at least a portion of the crystals removed from the second zone.

59. A method as set forth in claim 56, wherein is included the step of pre-treating the seeds to enhance crystal growth thereon before the seeds are introduced into the fluid.

60. A method as set forth in claim 59, wherein said pre-treating step includes etching the seeds.

61. A method as set forth in claim 59, wherein said pre-treating step includes coating the seeds with a chemical composition.

62. A method as set forth in claim 59, wherein the seeds are formed by a sintering process.

63. A method as set forth in claim 62, wherein the seeds are porous.

64. A method as set forth in claim 40, wherein said step of directing the separated liquid fraction includes injecting the liquid fraction into a subterranean formation.

65. A method as set forth in claim 64, wherein is included the step of filtering the liquid fraction before said injecting step to remove suspended solids therefrom.

66. A method as set forth in claim 65, wherein is included the step of adding the removed suspended solids formed by said filtering step to the fluid in said second zone.

67. A method as set forth in claim 40, wherein is included the step of removing a portion of the fluid from said second zone, heating the removed portion of the fluid at a third zone to increase the vapor fraction thereof and to concentrate the solid fraction thereof, and returning the heated fluid to said second zone from the third zone.

68. A method as set forth in claim 67, wherein said heating step includes moving a portion of the vapor fraction directed out of the first zone into heat exchange relationship to the fluid removed from the second zone.

69. A method as set forth in claim 40, wherein is included the step of adding a binary fluid to the fluid in the first and second zones.

70. A method as set forth in claim 69, wherein the binary fluid is selected from the group including isobutane and isopentane.

71. A method as set forth in claim 40, wherein is included the step of adding a chemical component to the fluid.

72. A method as set forth in claim 40, wherein is included the fluidizing step includes relieving the supersaturation of the fluid to stabilize the fluid so as to minimize post-precipitation after the fluid has been directed out of said second zone.

73. A method as set forth in claim 40, wherein said fluid includes a slurry, and including the step of varying the slurry concentration of the fluid to control the rate of crystal growth and the size of the crystals in the second zone.

74. A method as set forth in claim 73, wherein said varying step includes changing the rate of removal of crystals from the second zone.

75. A method as set forth in claim 40, wherein the liquid fraction directed out of the second zone is a solution containing dissolved and suspended solids, said step of directing the liquid fraction out of the second zone includes moving the solution to a third zone, and including the steps of fluidizing the solution in the third zone to cause the solid, liquid and vapor fractions of the solution to be in intimate contact with each other, directing the vapor fraction of the solution out of the third zone, moving the remainder of said solid and liquid fractions of the solution to a fourth zone adjacent to the third zone, separating at least a portion of the liquid fraction of the solution in the fourth zone from the solid fraction, growing crystals in the third and fourth zones as a function of the movement of the solution through said zones, removing crystals from said fourth zone and directing the separated liquid fraction of the solution out of the fourth zone.

76. A method as set forth in claim 75, wherein the fluidizing step in the third zone includes flashing said solution to form the vapor fraction thereof.

77. A method as set forth in claim 75, wherein said step of directing the vapor fraction of the solution out of the third zone includes moving the vapor fraction to a work-producing apparatus.

* * * * *